Figure 1:
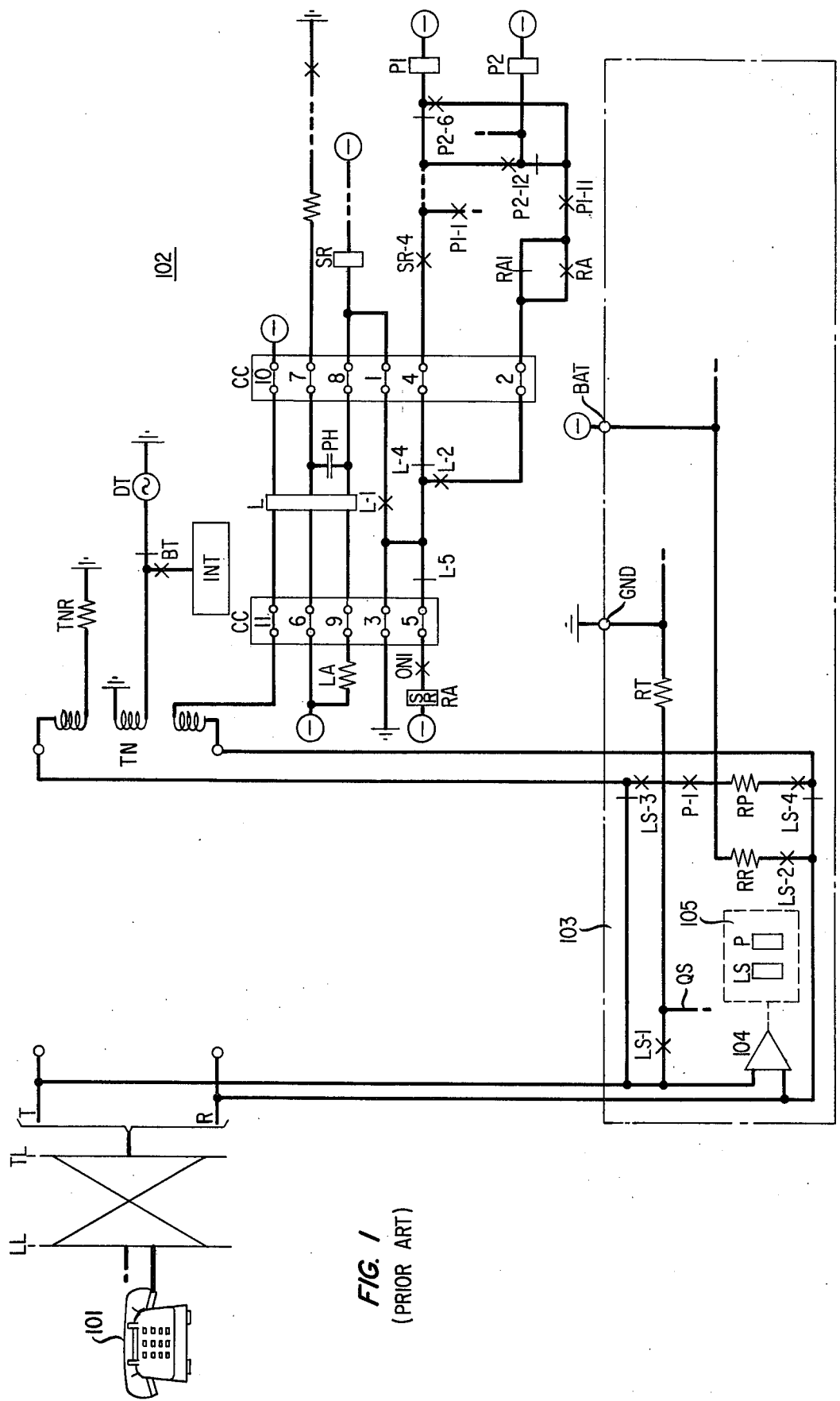

United States Patent [19]

Koster

[11] 4,093,826
[45] June 6, 1978

[54] TONE SIGNALING CONVERSION APPARATUS

[75] Inventor: Frederick Henry Koster, Granite Springs, N.Y.

[73] Assignee: American Telephone and Telegraph Inc., New York, N.Y.

[21] Appl. No.: 759,832

[22] Filed: Jan. 17, 1977

[51] Int. Cl.² ............................................. H04M 3/42
[52] U.S. Cl. ................................................ 179/16 EC
[58] Field of Search .......... 179/16 A, 16 AA, 16 EC, 179/18 EB, 18 F, 18 FA, 1 PC

[56] References Cited
U.S. PATENT DOCUMENTS

| | | | |
|---|---|---|---|
| 2,875,278 | 2/1959 | Lueders | 179/1 PC |
| 3,453,391 | 7/1969 | Hubbell | 179/16 EC |
| 3,818,144 | 6/1974 | Druyff et al. | 179/16 EC |
| 3,917,913 | 11/1975 | Patten | 179/16 EC |

*Primary Examiner*—Kathleen H. Claffy
*Assistant Examiner*—Randall P. Myers
*Attorney, Agent, or Firm*—Howard R. Popper

[57] ABSTRACT

A circuit is provided for improving the manner in which tone signaling-to-dial pulse converters interface with prior art dial pulse registers. Instead of allowing the converter to operate the register's line supervisory relay, the converter directly operates the dial pulse counting relays of the register. In this way, changes in battery and ground potential and impedance which may be noticeable each time the conversion apparatus pulses the line relay are eliminated, and the line relay in the register is allowed, uninterruptedly, to supply battery and ground to the multifrequency signaling station throughout the duration of signaling. The direct operation of the pulse counting relays permits faster pulsing speeds because neither the distributed capacitance of the line nor the lumped capacitors used in connection with the line relay are in the pulsing path.

7 Claims, 2 Drawing Figures

TONE SIGNALING CONVERSION APPARATUS

BACKGROUND OF THE INVENTION

This invention relates to telephone call signaling, and more particularly, to the extension of tone-signaling service through switching offices originally designed to receive call-signaling information in the form of conventional or rotary dial pulsing.

The introduction of the tone-signaling telephone set has proceeded apace since it was made possible by various of L. A. Meacham's inventions, including those disclosed in U.S. Pat. No. 2,824,173 issued Feb. 18, 1958, entitled, "Transistor Selective Ringing, Dialing and Party Indentification Circuit," and U.S. Pat. No. 3,060,275 issued Oct. 23, 1962, entitled, "Telephone System Signaling." Numerous pre-existing telephone switching systems have been modified to serve tone-signaling telephone sets by the inclusion of conversion apparatus to receive and convert the tone signals to a form usable by the originally installed dial pulse responsive equipment. As electronic switching systems were introduced, provisions were made in their original design to serve both tone-signaling and dial-pulsing telephone sets. The goal of modifying all of the originating registers in existing No. 5 Crossbar offices, as well as the subscriber sender in existing No. 1 Crossbar offices, has, however, become an expensive undertaking. Accordingly, interim conversion equipment has been employed in some installations to avoid the necessity of wholesale replacement of registers or extensive modification thereof.

One form of conversion equipment utilizes a tone receiver that is bridged across the line. When the receiver detects the presence of a tone signal, it splits the line, provides the tone-originating (calling) end with resistance battery and ground, and repeats a dial pulse translation of the tone signal to the line relay in the register. At the conclusion of outpulsing to the register, the adapter unit removes its resistance battery and ground and cuts through the calling end to the register, which then provides the normal battery and ground conditions to the line. In effect, the conversion unit operates the register's line relay in the same fashion as would the prior art rotary dial telephone set.

Some telephone customers have experienced annoyance with the loudness of the clicks occasioned by the operation of the line-splitting relay in the conversion unit. This difficulty has been traced to the difference in impedance presented to the line when battery and ground is provided through the conversion unit on the one hand, and from the register on the other. Other customers have complained about the delay in receiving second dial after dialing an initial directing digit (usually "9") in certain private branch exchanges. This delay is attributable to the delays attendant upon the converter unit splitting and restoring the line continuity.

SUMMARY OF THE INVENTION

I have discovered that it is neither necessary nor desirable for the conversion unit to operate the register in the same way that the rotary dial telephone set did in order to transmit call-signaling information to the register.

Thus, instead of the conversion apparatus splitting the line when tone signaling is detected and substituting resistance battery and ground for the battery and ground provided through the registers's line relay, the line relay is permitted to continue supplying normal battery and ground before, during and after tone signaling. The dial pulsing contacts of the conversion apparatus no longer pulse the register's line relay as did the dial pulsing contacts of the prior art rotary dial telephone set, but are provided with a path directly to operate the register's dial pulse counting relays. In one illustrative embodiment applicable to those registers which employ a plug-in type of line supervisory relay, an adapter unit may be interposed between the prongs of the line supervisory relay and its receptacle. The adapter unit functions to continue certain of the register's connections to the windings and contacts of the supervisory relay, to connect taps at certain others of the windings and contacts, and to interpose specific paths of the conversion apparatus at still others of the connections.

It is an advantage of my invention that, by dispensing with the prior art need to supply dial pulses to the register's line relay, a considerable increase in the speed of registering the call signaling information may be obtained. As is well known, the conventional line relay cannot be pulsed more rapidly than about 20 pulses per second because, by eliminating the pulsing of the line relay, higher speed dial pulses may be applied directly to the pulse counting relays in the register. These relays have inherently faster response times because they are not burdened by the capacitive time constants of the telephone line or of the response-tailoring capacitors conventionally associated with the windings of the line relay.

Figure 2:
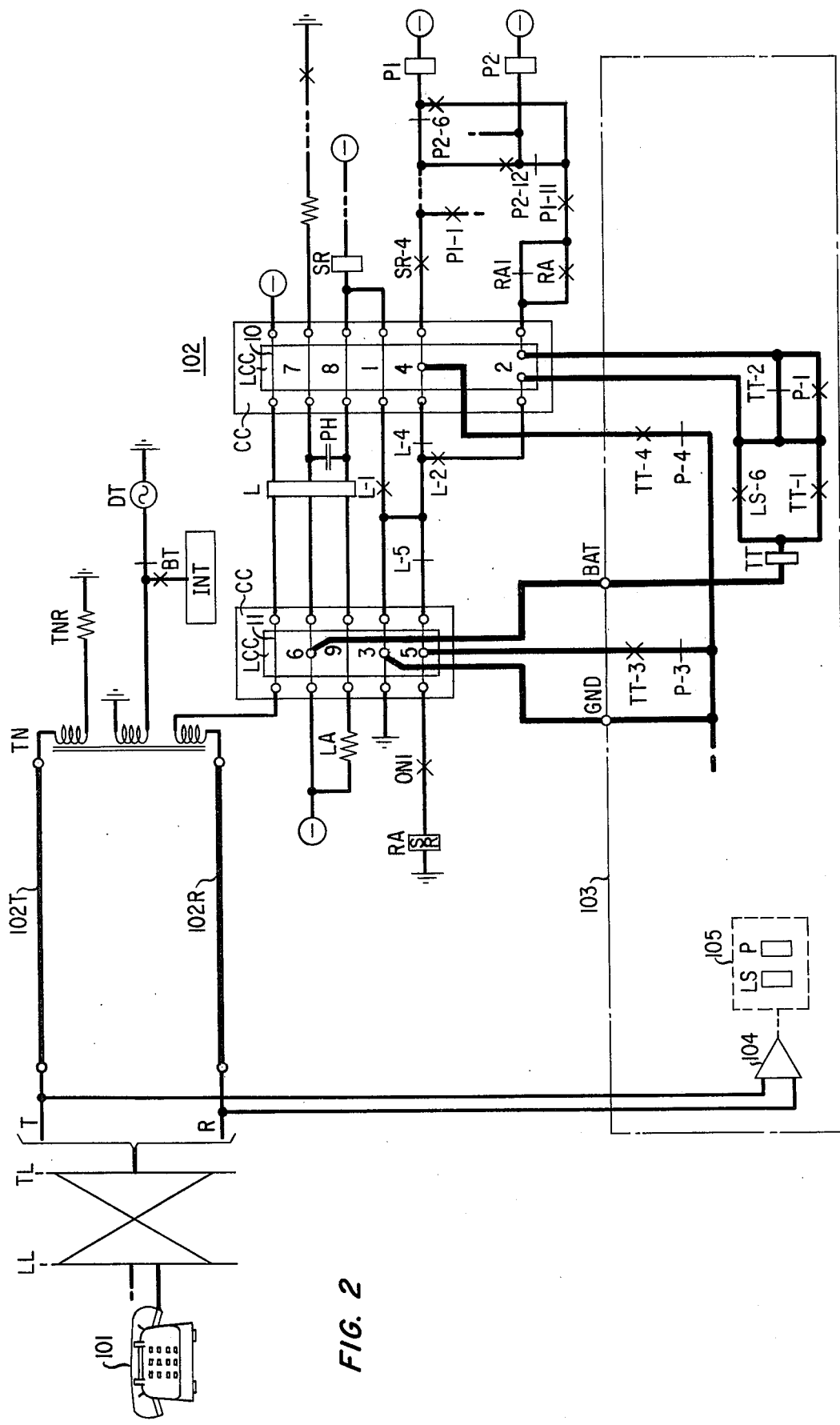

The foregoing and other objects and features may become more apparent from the ensuing description when read together with the drawing in which:

FIG. 1 shows the prior art arrangement for converting tone signals to dial pulses, and FIG. 2 shows my improved arrangement for interfacing a prior art tone-to-dial pulse conversion unit with a dial pulse register.

THE PRIOR ART

FIG. 1 shows a prior art arrangement for converting a dial pulse originating register so that it can serve a tone-signaling telephone set. The telephone set 101 is shown at the left and is equipped with an array of key buttons for generating tone signals of the type disclosed in any of the aforementioned patents to L. A. Meacham. In the illustration, telephone set 101 is served by a central office equipped with a crossbar switching machine such as that disclosed in A. J. Busch U.S. Pat. No. 2,585,904 issued Feb. 19, 1952. Such a switching machine includes line link and trunk link frames LL and TL, by means of which a number of subscribers can be accorded access to a plurality of trunks. During the initial portion of the call, connection will be made between the line link frame appearance of calling telephone set 101 and the trunk link frame appearance of an originating register such as register 102 shown in the drawing. Before tone-signaling telephone sets were introduced, the contacts of a rotary dial telephone set (not shown) would be interposed between the tip and ring conductors directly to operate and release line relay L of the originating register in step with each pulse of the dialed digit.

After the introduction of tone-signaling telephone sets, it became necessary to install tone conversion apparatus 103 in the path from the trunk link frame TL to the line relay L. Tone conversion apparatus 103 includes a tone detector 104 which responds to the appearance of a tone signal at conductors T and R to operate a plurality of relays in translation circuitry 105. Since the manner of the operation of circuits 104 and 105 is well known and is not part of my invention, the details of their circuitry are omitted, and their operation will be summarized only insofar as is necessary for present purposes. Immediately upon detecting the presence of a tone signal, relay P is operated. Its make contact P-1 closes and prepares a pulsing bridge toward the windings of register 102's line relay L. Immediately thereafter relay LS operates. Relay LS is equipped with make-before-break contacts. At its make contacts LS-1 and LS-2, relay LS completes a path to supply ground and battery to the calling line tip and ring conductors T, R. At the make contact of its transfer contacts LS-3, LS-4, relay LS completes the resistance pulsing bridge including operated make contacts P-1 and resistor RP toward register relay L. At the back contacts of transfer contacts LS-3, LS-4, the continuity of the tip and ring conductors is opened between the calling line and the ground and battery normally provided through the windings of tone transformer TN and the upper winding of line relay L. In this prior art arrangement relay L is equipped with a conventional 11-pin base which plugs into a socket CC, the 11-pin connections utilized being numbered within the socket CC.

Pulsing relay P is thereafter released and reoperated a number of times in accordance with unit 105's translation of the tone signal for the first digit keyed by telephone set 101. Relay L follows the pulsing of relay P and thus operates and releases to record a number of dial pulses in the same manner as that in which that relay would respond to dial pulses had they been directly transmitted by a prior art rotary dial telephone set.

Resistors RT and RR are provided in conversion unit 103 to detect on-hook supervision, either developing a suitable potential properly to operate a transistor (not shown). After one interdigital interval, translation circuitry 105 releases relays P and LS, reestablishing the continuity between the subscriber's tip and ring and the battery and ground provided over the windings of transformer TN and relay L.

Relay L is a magnetically biased polarized mercury contact relay with three windings. The primary, or uppermost, winding is the line winding and operates the relay in circuit with the customer loop. The tertiary, or center winding, is a pulse-aiding winding wired in series with the pulse-helping capacitor PH to contact L-1. Contact L-1 operated closes a circuit to permit capacitor PH to charge. The direction of this charging current through the tertiary winding is such as to tend to hold relay L operated and is reduced to zero as capacitor PH becomes fully charged. Relay L is then placed under the full control of its primary and secondary, or lowermost, windings. When the circuitry of its primary winding is opened, relay L releases. At its released make contacts L-1, ground is removed from the lower end of capacitor PH. Capacitor PH then discharges through the winding of supervisory relay SR, and the current in the tertiary winding is such as to tend to hold contacts L-1 open. Relay SR is a slow-release relay that will hold over the momentary intervals during which contacts L-1 of relay L are open during dial pulsing. If relay SR is finally released by a long-duration release of relay L, its work contacts (not shown) will initiate operations to release register 102 as would occur if the call were abandoned by the calling party using telephone set 101. The tertiary winding and the PH capacitor thus act to insure that, once relay L operates, it will remain operated for a specifiably minimum interval, and that, once it is released, it will remain released for a specifiable minimal interval. This pulse-correcting action is well known and makes possible the operation of the relay on longer loops than would otherwise be possible.

The secondary winding of relay L is used for slightly altering the sensitivity of the relay as it operates and releases. This winding is also connected to contacts L-1 and is poled to oppose the primary winding. The effect of the secondary winding is thus to make the operation of relay L, once it operates, somewhat easier to release and, once it releases, somewhat easier to operate. The value of resistor LA is chosen to give the optimum benefit of this type of operation. The contacts of relay L advantageously may employ a common armature spring which can motivate two independent front contacts numbered L-1 and L-2 and two independent back contacts numbered L-4 and L-5.

Relay L is normally operated over the tip and ring conductors in step with dial pulses that may be transmitted by a rotary dial telephone (not shown) or by conversion unit 103. The operation and release of relay L operates the pulse-counting relays P1 and P2 in register 102. This operation will now be briefly summarized.

When relay L releases on the first open circuit of dial pulsing, a path is provided which may be traced from ground, released back contact L-4, operated make contact SR-4, the dotted circuitry representing intermediate paths not presently of interest, and the back contact of transfer contacts P2-6 to the winding of the pulse counting relay P1. Relay P1 then locks over one of its make contacts (not shown, but assumed to lie within the dotted line aforementioned) to an off-normal ground.

When relay L reoperates at the end of the first open pulse, ground is provided over operated make contact L-2, operated make contact P1-11, and back contact P2-12 to operate relay P2. Relay P2 then locks to an off-normal ground in series with an operated contact of relay P1 (not shown) and, at its now-operated back contact P2-12, opens its aforementioned operating path. The holding circuit for relay P1 is transferred at transfer contacts P2-6 to the ground provided at make contact L-2. On the next dial pulse release of relay L, relay P1, in releasing, opens the holding circuit to the off-normal ground for relay P2 (not shown), but relay P2 is held operated by the ground made available over released back contact L-4. On the next operation of relay L, back contact L-4 opens, releasing relay P2. This cycle is then repeated with relays P1 and P2 remaining operated at the end of each odd-numbered pulse and remaining normal at the end of each even-numbered pulse. Additional relays (not shown) operate other work contacts (not shown) of relays P1 and P2. Relays P1 and P2 are operated in various combinations to count and store the number of operations of relays P1 and P2. The circuitry of pulse counting relays P1, P2 and the remaining pulse counting relays (not shown) is well known and further description thereof would not seem to be necessary herein for an understanding of my invention.

The foregoing somewhat detailed description of the prior art operation of relay L and of counting relays P1 and P2 is important because it is essential that register 102 continue to be able to function to serve calls from rotary dial telephone sets as well as to serve tone-signaling telephone sets in an improved manner. The detailed interface circuitry of my invention, hereinafter to be more fully explained, aims at the achievement of these dual goals.

While circuits 103, 104 and 105 are fully effective to convert tone signals transmitted by telephone set 101 into dial pulses adequate to operate and release relay L, certain unsettling phenomena have been noticed by some telephone customers. The differences in potential or impedance presented to the tip and ring between the operations and releases of relay LS may sometimes be sufficiently great to cause the calling party at station set 101 to hear an audible click. Moreover, if the originating register 102 is serving a crossbar office equipped for Centrex operation (see Fisher et al U.S. Pat. No. 3,253,088 issued May 24, 1966), a telephone subscriber, to make an outgoing call, will dial an initial directing digit 9. Translation circuitry 105 requires 450 milliseconds to outpulse the digit 9 and an additional interval of 350 milliseconds of interdigital timing before relay LS can be released. Only when relay LS is restored to normal can the dial tone, coupled through dial tone transformer TN, be received by the calling party as the "second dial tone." Some customers have complained about this delay in receiving such second dial tone. When the customer commences keying the called number, two audible clicks may be heard for each digit dialed. The first key click occurs when converter 103 splits the continuity of the tip and ring, and the second key click occurs when unit 103 re-establishes continuity to the battery and ground provided over the windings of transformer TN and relay L.

THE INVENTIVE SOLUTION TO THE PRIOR ART PROBLEM

Referring to FIG. 2, I have provided an L-relay interface connector circuit LCC between the prior art L-relay, the prior art originating register 102 and the prior art converter circuit 103 and I have provided certain modifications internal to unit 103. In addition, I have, with jumpers 102T and 102R, restored the continuity of the tip and ring conductors from the trunk link frame appearance TL of register 102 to the terminals of tone transformer TN and the windings of relay L. In accordance with the operation of the circuitry of FIG. 2, the relays in converter 103 no longer split or transfer the continuity of the tip and ring conductors away from the battery and ground made available over the windings of the tone transformer TN and line relay L of register 102. The register's battery and ground are always in continuous connection to the subscriber's loop and always present the same impedance thereto. Since the register's battery and ground are not changed during call signaling, no key clicks will be heard since none are applied to the speech transmission path T, R. In addition, the operating mode of converter 103 is changed in that it no longer pulses the line relay L of the originating register. Instead, the pulsing contacts of relay P are now connected via my line relay interface connector circuit LCC to directly operate pulse counting relays P1 and P2 of the register.

My invention, in one embodiment thereof, will be of particular advantage and utility in those types of originating registers in which relay L plugs into the socket receptacle in the register. In this type of register installation, the prior art relay may be unplugged and the L-relay interface connector LCC of my invention may be plugged into the register's L-relay receptacle. Then the L-relay may be plugged into interface connector LCC. In one illustrative embodiment where the L-relay is equipped with a conventional 11-pin base, (similar to the conventional "octal" vacuum tube base) the L-relay interface connector comprises a "doughnut" having pins to plug into the register's receptacle and jacks to accept the pins of the L-relay. In FIG. 2 to simplify the drawing, the socket CC is depicted with the adapter LCC as if between its terminals.

Interface connector LCC continues the continuity of some of the leads from relay L to register 102 (see pin connections numbered 1, 7, 8, 9, 10 and 11), supplies taps to certain other of the connections (see pin connections 3, 4, 5 and 6) and interposes additional circuitry at still others of the connections between relay L and register 102 (see pin connection number 2).

In accordance with my invention, standardized connections for supplying battery and ground to converter 103 are supplied from pin terminals 6 and 3 of connector LCC. In this manner, the impedance and potential of the battery and ground sources are standardized for all installations. In addition, the contacts of the LS relay in converter 103 are no longer employed to split the continuity of the tip and ring conductors at the trunk link TL appearance of register 102. Instead, jumpers 102T and 102R permanently wire the continuity of the tip and ring conductors to the ground and battery provided over the windings of the tone transformer TN and the line relay L. Accordingly, there will be no delay in the return of "second" dial tone, from dial tone source DT to set 101 occasioned by the operation and release of relay LS. One contact of relay LS may, however, advantageously be employed in implementing the illustrative embodiment of my invention. This contact, labeled LS-6 in FIG. 2, completes an operating path to newly provided relay TT so long as relay L in register 102 is operated.

It will be recalled that, in the prior art operation of converter 103, relay LS is operated immediately after receiver 104 detects the presence of a tone signal on the tip and ring conductor T, R and operates relay P. Relay LS remains operated while relay P is released and reoperated a number of times determined by unit 105's translation of the received tone signal. At the completion of relay P pulsing, relay P is maintained operated by unit 105 and relay LS releases which, in turn, releases relay P. Relay TT, which is provided in the illustrative embodiment of my invention, is initially operated by contact LS-6 as soon as relay LS is operated. Relay TT does not, however, release when relay LS releases at the end of each dialed digit. Instead, relay TT locks as soon as it is operated to a ground provided over its make contact TT-1 and pin connector 2 of interface connector LCC. Ground is made available at the left-hand side of pin connector 2 over a path which may be traced over operated make contact L-2 and pin connector 3 of interface connector LCC. The L-relay was priorly operated over the loop by the off-hook condition of calling telephone set 101. Prior to the time that relay TT operates, ground is extended around pin connection 2 of interface connector LCC by released break contact TT-2. When relay TT operates and locks, as just described, it opens contacts TT-2 and provides, at its operated make contacts TT-4 and TT-3, control paths to pin terminals 4 and 5 of interface connector LCC.

When converter 105 commences the release and reoperation of relay P incident to the translation of a tone digit into dial pulses, make contact P-1 will remove and reapply a pulsing ground to pulse counting relay P2, and break contact P-4 will apply and remove a pulsing ground to the winding of pulse counting relay P1 in register 102. The substitution of break contact P-4 and make contact P-1 for break contact L-4 and make contact L-2 of the L-relay, which were used in the prior art FIG. 1, enables converter 103 directly to operate pulse counting relays P1 and P2 while allowing the windings of relay L to be maintained in continuous connection to the tip and ring leads of a calling telephone line.

At the completion of digit outpulsing, unit 105 maintains relay P operated as previously mentioned. At break contacts P-3, holding ground is removed from end-of-digit detecting relay RA in register 102. The substitution of break contact P-3 for break contact L-5 of relay L allows converter unit 103 directly to operate the end-of-digit detecting relay RA. Relay RA is slow enough in releasing so that it is released during the interdigital interval and holds over only during the dial pulses constituting a single digit.

Referring to the parallelly connected break contacts TT-2 and make contacts P-1, when unit 105 detects the presence of a tone signal on the tip and ring conductors T, R, relays TT and P operate. On the first dial pulse (release) of relay P, break contacts P-4 apply ground over pin connection 4 of interface connector LCC and operated make contact SR-4 to the winding of pulse counting relay P1. Relay P1 operates and locks over its make contacts P1-1 to ground over circuitry not shown. The release of relay P at its break contacts P-3 applies operating ground to register relay RA over pin 5 of interface connector LCC. Relay RA is a slow release relay and holds over subsequent opens of dial pulsing. Contacts P-3 take the place of contacts L-5 which can no longer respond to dial pulsing. When relay P reoperates at the end of the first dial pulse, relay P2 is operated over a path from ground applied over operated make contacts P-1, operated make contacts RA and P1-11 and back contacts P2-12. The release and reoperation of relays P1 and P2 on subsequent dial pulses is similar to that previously described. However, relay P in converter 103 may advantageously pulse relays P1 and P2 at a much faster rate than relay L could have been pulsed because relays P1 and P2 are not encumbered either by the distributed line capacity or by tailoring capacitor PH. At the end of dial pulsing of all digits, relay TT will be released by the release of relay L. The release of relay L, at its now released make contact L-2, removes the holding ground for relay TT which releases. The circuitry is now restored to normal.

It should also be understood that, while the illustrative embodiment has been described in terms of a tone-signaling telephone set and a dial pulse originating register of a No. 5 Crossbar office, the principles of my invention are also applicable to the conversion of any combinatorial a.c. signals, generally, and, in particular, to the conversion of multifrequency signals to dial pulse signals at the incoming register. Accordingly, the terms "tone signaling" and "multifrequency signaling" are intended to be used interchangeably. It should also be apparent that the principles described herein may also be applied directly to operate the pulse counting relays that are used in connection with revertive pulse incoming registers.

Further and other modifications will become apparent to those skilled in the art without, however, departing from the spirit and scope of my invention.

What is claimed is:
1. An interface arrangement for adapting a register normally responsive to pulse signaling appearing at the register's line terminals for operation with a converter responsive to combinatorial a.c. signals in which the line relay of the register normally directly controls pulse counting means in the register, said arrangement comprising:
   means interposed between said line relay and said line terminals for allowing said line relay continuously to provide power to said terminals throughout the interval of operation of said converter, and
   means interposed at said line relay between said pulse counting means and said converter for permitting said converter directly to control said pulse counting means independently of said line relay.
2. An interface arrangement in accordance with claim 1 wherein said means interposed at said line relay between said pulse counting means and said converter includes contacts controlled by said converter in shunt and in series with respective contacts of said line relay.
3. An interface arrangement in accordance with claim 2 wherein said line relay has a plurality of pins insertable into a base socket of said register and further comprising a connector interposed between said pins and said base socket.
4. The arrangement according to claim 3 wherein said pulse counting means of said register includes a first and second relay winding, wherein said line relay includes a pair of transfer contacts, and wherein said means interposed at said line relay includes means for connecting a respective one of said converter-controlled contacts in circuit with a respective one of said transfer contacts to each of said windings.
5. The invention of claim 4 wherein one of said set of converter-controlled contacts is a make contact and the other thereof is a break contact, and wherein said means interposed at said line relay includes means for connecting said make contact in circuit with one and said break contact in circuit with the other of said first and second windings of said pulse counting means.
6. An arrangement including a tone-to-dial pulse converter for permitting a dial pulse responsive register to be controlled from a multifrequency tone-signaling source, said register having a line relay and pulse counting means normally controlled by operations and releases of said line relay to register a called telephone number, the improvement comprising:
   means interposed between the windings and contacts of said line relay and between said converter and said pulse counting means of said register, said interposed means including
   means for supplying standardized battery and ground to said converter from said register, and
   shunt and series path means controlled by respective pulsing contacts of said converter for providing auxiliary pulsing paths to said pulse counting means of said register operative when said line relay remains operated.
7. In combination, a tone-to-dial pulse converter including a pulsing relay,
   a register including a line supervisory relay normally mounted in a socket and plural state pulse counting relays normally controlled by said line supervisory relay, and
   means including a plug-in adapter connectable between said line relay socket and said line relay for providing paths for subjecting said pulse counting relays of said register to control by contacts of said pulsing relay of said converter and to pulse responsive contacts of said line relay.

* * * * *